No. 608,111. Patented July 26, 1898.
L. F. EATON.
BALL CASTER.
(Application filed Feb. 25, 1898.)
(No Model.)
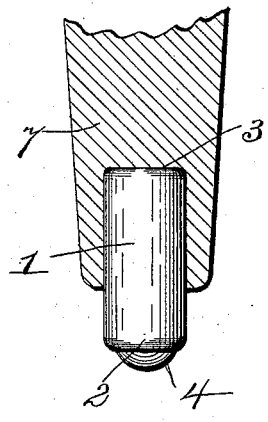
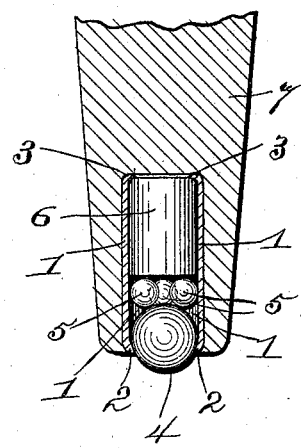
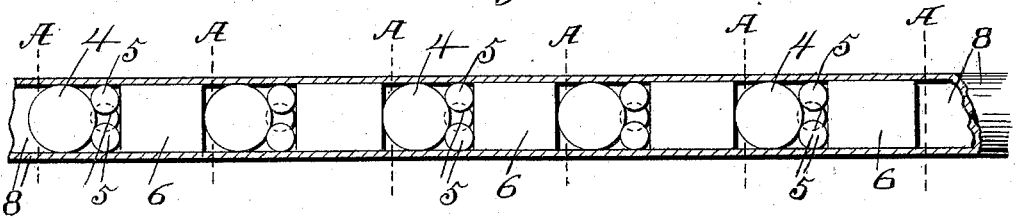
Witnesses.
W. H. Wills
A. McHenry
Inventor.
Leonard F. Eaton.
By
C. J. Belt
Attorney.

UNITED STATES PATENT OFFICE.

LEONARD F. EATON, OF SULLIVAN, INDIANA, ASSIGNOR OF ONE-HALF TO THOMAS B. EATON, OF SAME PLACE.

BALL-CASTER.

SPECIFICATION forming part of Letters Patent No. 608,111, dated July 26, 1898.

Application filed February 25, 1898. Serial No. 671,588. (No model.)

*To all whom it may concern:*

Be it known that I, LEONARD F. EATON, a citizen of the United States, residing at Sullivan, in the county of Sullivan and State of Indiana, have invented certain new and useful Improvements in Ball-Casters, of which the following is a specification.

This invention relates to furniture-casters, and particularly to the class of loose-ball casters.

The prime object of the invention is to provide a new and improved means for holding the balls, which means may be inserted into the furniture-leg and leave only the supporting-ball protruding from said leg, so as to bring the said ball as close to the end of said leg as possible, and thereby avoid all leverage between the leg, the said means, and the said ball or any other part of the caster.

A further object of the invention is to provide a tube or barrel to hold the balls therein and to a furniture-leg without other means of securing the balls or attaching the tube or barrel to the leg.

The invention consists in the novel construction of a tube or barrel to hold the balls therein, adapted to be inclosed by a furniture-leg.

In the accompanying drawings, forming part of this application, Figure 1 is a sectional view of a furniture-leg, showing the caster in position in elevation. Fig. 2 is a sectional view of the leg and caster, with the tube or barrel of the latter entirely inclosed by the said leg. Fig. 3 is a sectional view of a length of tubing containing balls and plugs in position for the tubing to be cut in proper lengths to produce a series or set of casters.

The same numeral-references denote the same parts throughout the several figures of the drawings.

The caster consists of a straight tube or barrel 1, the same diameter throughout its length and open at each end. One end of the tube has an inwardly-turned circular edge or lip 2 and the other end a like lip 3.

The supporting-ball 4 is loosely held in the tube 1 by the lip 2, with a slight protrusion. A series of loose balls 5 (preferably three) rest on the ball 4 within the tube, and the lip 3 holds a plug 6 within the tube, with one end resting on the bearing-balls 5 to keep them in engagement with the ball 4. The other end of the plug and the lip 3 close the upper end of the tube, and the ball 4 and lip 2 close the lower end of the tube.

The furniture-leg 7 has simply to be bored to the size of the tube to be fitted thereto, or where legs are already bored a proper-size tube may be selected and placed entirely within the leg or as far therein as desired, with a portion of the ball 4 protruding. This is accomplished without screws, pins, or any other fastening device by simply making a close fit between the leg and tube.

The casters are made by filling a length of tubing 8 (or enough tubing to produce a set of casters of a desired size) with the balls 4 and 5 and the plugs 6 between each set of balls and the tubing cut apart or otherwise severed at the dotted lines A. The cutting will chamfer the ends of the series of tube-sections sufficiently to form the lips 2 and 3, and as each cut is made a complete caster ready for use is produced, and one edge of the remaining tubing is chamfered.

A caster constructed as above described is entirely dust-proof, requires no means for attaching to furniture, no oiling, and all leverage is completely avoided.

I do not wish to be understood as limiting myself to any particular material either in the tubing or balls, to any special size, to the number of balls, nor to any special means for severing the tubing into parts.

Having thus described my invention, what I claim as new, and desire to secure by Letters Patent, is—

A caster comprising a straight tube or barrel adapted to be inserted into a furniture-leg the whole length of the tube, an inwardly-turned lip at each end of the barrel, the plug and the balls held in the barrel by the said lips, with one of said balls protruding from the barrel, as set forth.

In witness whereof I hereunto set my hand in the presence of two witnesses.

LEONARD F. EATON.

Witnesses:
C. T. BELT,
W. H. WILLS.